United States Patent Office 3,023,760
Patented Mar. 6, 1962

3,023,760
METHOD OF DECREASING FRICTION LOSS IN FLOWING FLUIDS
Charles D. Dever, Tulsa, Okla., and Raymond J. Harbour and Walter F. Seifert, Midland, Mich., assignors to The Dow Chemical Company, Midland, Mich., a corporation of Delaware
No Drawing. Filed Feb. 3, 1961, Ser. No. 86,863
8 Claims. (Cl. 137—13)

This invention relates to a method of decreasing friction loss in flowing fluids. More particularly it pertains to an additament added to aqueous mixtures which will reduce the friction loss obtained in the fluid flow.

It is well known that in fluid flow, energy must be expended to overcome the loss due to the friction encountered in the movement of the fluid. While the pressure drop obtained in pumping a small amount of fluid a short distance is small, the energy expended becomes very considerable when large amounts of a fluid are moved, such as in industrial plants and processes. Thus, an additament which reduces the friction loss in flow of fluids will appreciably decrease the pumping costs.

It is, therefore, an object of this invention to provide an additament which when added to water or an aqueous fluid will reduce the friction loss resulting from the flow of the fluid. A further object is to provide a process for the pumping of aqueous fluids wherein the pressure drop due to fluid flow is appreciably decreased.

The above and other objects are attained according to this invention by adding from 0.005 to 1.0 weight percent of a water-soluble, linear, high molecular weight monoalkenylaromatic sulfonate polymer as fully set forth hereinafter. By the addition of the small amounts of the polymer to an aqueous fluid, the pressure drop due to friction loss in fluid flow may be decreased by as much as 87 percent.

The water-soluble, linear, high molecular weight polymer sulfonates with which this invention is concerned correspond to addition polymers of monoalkenylaromatic sulfonates having the formula

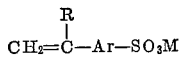

wherein Ar is a divalent aromatic radical selected from the group consisting of hydrocarbon radicals and nuclear chlorinated hydrocarbon radicals having its valence bonds on nuclear carbon atoms, R is a member of the group consisting of hydrogen and methyl, M is a cation, and the other symbols have their usual meanings. Specific examples of sulfonates which are used in accordance with this invention are water-soluble, linear, high molecular weight polymers of styrenesulfonic acids, alpha-methylstyrenesulfonic acids, ar-methylstyrenesulfonic acids, ar-dimethylstyrenesulfonic acids, alpha-ar-dimethylstyrenesulfonic acids, ar-ethylstyrenesulfonic acids, ar-isopropylstyrenesulfonic acids, vinylnaphthalenesulfonic acids, ar-chlorostyrenesulfonic acids, ar-dichlorostyrenesulfonic acids, ar-chloro-ar-methylstyrenesulfonic acids, and the water-soluble salts of such resin sulfonic acids.

The term "sulfonate" is used herein to mean the free sulfonic acid and its salts, M in the foregoing formula being a cation, including hydrogen and metal, ammonium, amine, and like salt-forming cations. Specific examples, for purpose of illustration and not of limitation, of suitable salts are the sodium, potassium, ammonium, and amine salts of the polymer sulfonates.

The addition polymers correspond to homopolymers of the monoalkenylaromatic sulfonates, copolymers of two or more of such sulfonates, and copolymers of one or more of such sulfonates and one or more of other monoethylenically unsaturated monomers wherein the monoalkenylaromatic sulfonate is at least 60 percent by weight of the total polymer. In the latter such polymers, units corresponding to a monoalkenylaromatic sulfonate are additionally combined with units corresponding to one or more kinds of monoethylenically unsaturated compounds examples of which, for purpose of illustration and not of limitation, are styrene, α-methylstyrene, ar-methylstyrenes, ar-dimethylstyrenes, α-ar-dimethylstyrenes, ar-ethylstyrenes, ar-isopropylstyrenes, vinylnaphthalenes, ar-chlorostyrenes, ar-dichlorostyrenes, ar-chloro-ar-methylstyrenes, isobutylene, ethylenically unsaturated esters, e.g. 1–12 carbon atom alkyl esters of acrylic or methacrylic acids, vinyl esters of fatty acids such as vinyl acetate, vinyl chloride, vinylidene chloride, methyl isopropenyl ketone, methyl vinyl ether, and acrylonitrile.

The term "water-soluble" is used herein to mean that the polymer sulfonates form true or colloidal solutions in pure water, which solutions are practically free of gel particles and infinitely dilutable with water.

By the term "linear" it is meant that the polymeric chain is free or nearly free of crosslinkages. A water-soluble polymer sulfonate is regarded as linear for practical purposes of this invention if its water solution is free of gels, infinitely dilutable with water, and filterable through ordinary filter paper (Whatman's Number 1) without loss of viscosity.

The term "high molecular weight" is used herein to mean that the polymer sulfonates have average molecular weights such that their "Brookfield viscosity" values are at least 200 centipoises. The term "Brookfield viscosity" as used herein and represented by the symbol $V_b$ is the viscosity value in centipoises at 25° C., of a neutral solution in water at 0.5 percent by weight concentration of the sodium salt of the polymer sulfonate as determined with the Brookfield viscometer using the No. 1 or No. 2 spindle rotated at 6 revolutions per minute (Leaman, Rubber Age, vol. 69, pp. 702–703).

The average molecular weight of a sulfonate whose Brookfield viscosity value is 200 centipoises is believed to be approximately 1.0 million; one whose Brookfield viscosity value is 900 centipoises is believed to have an average molecular weight of approximately 3.0 million. Polymers having an average molecular weight in the range of 4 to 10 million or a viscosity in the range of 1300 to 4000 centipoises are preferred.

The water-soluble, linear, high molecular weight polymer sulfonates for use in this invention are obtained either by polymerization of the corresponding monoethylenically unsaturated monomers including a monoalkenylaromatic sulfonate or by sulfonation of a starting polymer of monoethylenically unsaturated monomers including a polymerically combined monoalkenylaromatic hydrocarbon or nuclear chlorinated monoalkenylaromatic hydrocarbon.

When the polymer sulfonates are obtained by sulfonation of a monoalkenylaromatic polymer resin, the resin starting material is a toluene-soluble, thermoplastic, linear, high molecular weight addition polymer of a monoalkenylaromatic hydrocarbon or nuclear chlorinated monoalkenylaromatic hydrocarbon having the general formula:

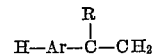

wherein H—Ar is a monovalent aromatic hydrocarbon or nuclear chlorinated hydrocarbon radical having its valence bond on a carbon atom of a sulfonatable aromatic nucleus, R is hydrogen or a methyl radical, and the other symbols have their usual meanings. By "sulfonatable," it is meant that the nucleus of the aromatic radical has at least one hydrogen atom replaceable by the sulfonic acid group by reaction with sulfonation agents such as sulfuric acid and sulfur trioxide.

Examples of such monoalkenylaromatic polymers are the solid homopolymers of styrene, α-methylstyrene, ar-methylstyrenes (ar - vinyltoluenes), ar - dimethylstyrenes, α - ar - dimethylstyrenes, ar - ethylstyrenes, vinylnaphthalenes, and ar-chlorostyrenes; copolymers of two or more of such monoalkenylaromatic compounds, e.g. copolymers of styrene and ar-vinyltoluene and copolymers of styrene and α-methylstyrene; and copolymers of a major proportion of one or more of such monoalkenylaromatic compounds and a minor proportion of other monovinylidene compounds such as monoethylenically unsaturated hydrocarbons, e.g. isobutylene, monoethylenically unsaturated esters, e.g. 1–12 carbon atom alkyl esters of acrylic or methacrylic acid, and acrylonitrile.

When the polymer sulfonates for use in this invention are made by sulfonation of monoalkenylaromatic hydrocarbon or nuclear chlorinated hydrocarbons, the starting polymers are further characterized as being linear, i.e., free of crosslinkages, and having high molecular weight, i.e. corresponding to toluene-soluble, solid thermoplastic polymers of the kind just described whose solution viscosity, $V_s$, values are at least 300 centipoises. The term "solution viscosity," as used in the present specification and claims and represented by the symbol $V_s$ means the viscosity value in centipoises at 25° C. of a 10 percent by weight solution of the polymer in toluene as determined with a modified Ostwald viscometer (1949 A.S.T.M. Standards, Part 6, pp. 478–479). Ordinary molding grades of polystyrene have solution viscosity values in the order of 20–25 centipoises and are not suitable for the present purposes.

Moreover, it is necessary that the means and method of sulfonation of the starting monoalkenylaromatic polymers be such that the resulting polymer sulfonates are water-soluble, linear, high molecular weight products whose Brookfield viscosity values, $V_b$, are at least 200 centipoises and not greater than a value numerically related to the value of the solution viscosity of the starting monoalkenylaromatic polymer in accordance with the formula:

$$\log_{10} V_b = 1.4 + 0.65 \log_{10} V_s$$

wherein $V_s$ is the solution viscosity value of the starting monoalkenylaromatic polymer and $V_b$ is the Brookfield viscosity value of the sulfonated polymer, both as hereinbefore described.

Methods are already known per se for making polymer sulfonates conforming to the above-described characteristics. However, it will be understood by those skilled in the art that methods of making polymer sulfonates do not invariably produce products having the characteristics set forth above. It is the polymer sulfonate that is controlling in the present invention and not the procedure by which it is prepared.

A small amount of the polymer may be used to decrease the friction loss. The optimum amount will vary somewhat with the polymer, the molecular weight of the polymer, and the flow conditions to which the fluid is subjected. High molecular weight polymers are normally more effective in small concentrations than the low molecular weight polymers. Generally from .012 to 0.36 weight percent of the polymer is employed. To obtain the above percentages of the polymer in the fluid, usually an amount of from 1 to 30 pounds of the polymer per 1,000 gallons of water or fluid is required. At times, as little as 0.005 weight percent (about .5 pound of polymer per 1,000 gallons) may be effective under moderate velocities. An amount greater than 30 pounds or up to about 1 weight percent may also be used. However, above 30 pounds per 1,000 gallons, the viscosity of the aqueous fluid may increase, especially with the high molecular weight polymers, to the extent that it is undesirable except in cases where an increase in viscosity is beneficial, such as an oil well drilling or fracturing. The preferred concentration is in the range of 0.024 to 0.12 weight percent which corresponds to the addition of about from 2 to 10 pounds of the polymer per 1,000 gallons of the aqueous fluid.

The additaments or polymers are only effective in fluids under turbulent flow under substantially steady state conditions. The reduction in friction loss, increases with increase in turbulence to a certain point and then decreases with further turbulence. The term "steady flow," as used herein, means the flow of fluids in ducts such that the velocity profile remains substantially constant and is not changing within a given section of the duct or conduit. It is apparent that the velocity profile of fluids flowing in the immediate area of restrictions in the conduit, such as an orifice, venturi, or where the fluid has experienced a sudden contraction or expansion is changing and is not in steady state condition.

In determining the turbulence obtained by the flow of fluids to which the polymers have been added, a modified Reynolds number for power-law fluids is used as described and given by D. W. Dodge and A. B. Metzner in the A. I. Ch. E. Journal, volue 5, No. 2, June 1959. The modified Reynolds number is defined as:

$$\frac{D^{n'}V^{2-n'}\rho}{g_c K' 8^{n'-1}}$$

where:

D is the diameter or the wetted perimeter of the conduit or duct.
V is the mean linear velocity.
$\rho$ is the density of the fluid.
$g_c$ is the gravity conversion factor to contain consistent units and
$K'$ and $n'$ are the fluid consistency index and flow-behavior index, respectively, which expresses the relationship between shear stress and shear rate of the fluid as defined by the equation:

$$\text{Shear stress} = K' \text{ (shear rate)}^{n'}$$

In the above modified Reynolds number $K'$ and $n'$ are determined experimentally for the particular fluid from the relationship of shear stress and shear rates obtained.

On the basis of the modified Reynolds number as defined above, sufficient turbulence is obtained in fluids containing the polymer to result in an appreciable reduction in friction loss whenever the modified Reynolds number is above $3 \times 10^3$. The reduction in friction loss increases as the modified Reynolds number of the fluid containing the polymer is increased above $3 \times 10^3$, being especially effective at a modified Reynolds number of from $1 \times 10^4$ to $1 \times 10^5$. With an increase in the modified Reynolds number above $1 \times 10^5$ the reduction obtained gradually decreases so that no material advantage is gained by using the polymer at velocities such that the Reynolds number is above $1 \times 10^7$.

The polymers used are stable and may be subjected to repeated shear while in the aqueous mixture for considerable lengths of time without any material change in their effectiveness. Most of the polymers are also thermally stable and the addition of these polymers at the lower percentages only moderately affects the heat transfer coefficient. Thus the additaments may be used in cooling water used in heat transfer equipment. In addition to normal plant use, the additament may be used in processes and operations where high velocities or pressures are employed. For example, in oil well drilling, a drilling mud is generally pumped into the well at a high velocity to cool the drilling bit, provide a hydrostatic head, and to carry out the cuttings. The drilling mud is settled to remove the cuttings and it is then recycled. Also in fracturing of oil wells, an aqueous fluid at a high velocity is pumped into the well at a considerable velocity. The use of the additament in such operation to reduce the pressure drop can result in an appreciable saving in power consumption. In heat exchange and other plant operations, normally the fluid is pumped to the equipment in sufficient velocity to realize an appreciable saving in the pumping costs.

To further illustrate the invention, water containing the additament was pumped through piping of various sizes at different modified Reynolds numbers. The pressure drop obtained was compared to the pressure drop obtained when water was pumped through the apparatus at the same flow rate without the addition of the polymer.

The apparatus used comprised a 55 gallon tank in which the solution was stored. From the storage tank the solution was pumped by means of a positive displacement pump through a test section of pipe and then returned to the storage tank. The pressure drop was determined by measuring the pressure at the entrance and the discharge end of the test section by means of test gauges.

Pipes of 3/8 inch, 1/2 inch, 3/4 inch, and 1 inch were used as the test sections. The 3/8 inch pipe was a Schedule 80 steel pipe having a test section of 7 feet. The 1/2 inch and the 1 inch pipes were Schedule 40 steel pipes having test sections of 11.4 feet and 10.44 feet, respectively. The last test section was a 3/4 inch brass tubing of 11.38 feet long.

The pertinent data and results obtained are shown in the table below. In the table "Ré" means the modified Reynolds number obtained by the equation given above and the "$\Delta P$" is the pressure drop in pounds per square inch obtained over the test sections used.

| Pipe size | Flow rate, gal./min. | $\Delta P$ for water with no additament, p.s.i. | Sodium polystyrene sulfonate ($V_b$=3,000 cps.) | | | | | | Pressure drop of water with additament, p.s.i. Sodium polystyrene sulfonate ($V_b$=1,250) | |
|---|---|---|---|---|---|---|---|---|---|---|
| | | | 2#/1,000 gal. | | 10#/1,000 gal. | | 20#/1,000 gal. | | 2#/1,000 gal. | |
| | | | $\Delta P$, p.s.i. | Ré | $\Delta P$, p.s.i. | Ré | $\Delta P$, p.s.i. | Ré | $\Delta P$, p.s.i. | Ré |
| 1" schedule 40 | 10 | .35 | .11 | 19,150 | .22 | 4,800 | .24 | 4,380 | .32 | 15,400 |
| | 15 | .76 | .21 | 22,100 | .35 | 8,400 | .39 | 7,880 | .55 | 25,500 |
| | 25 | 2.04 | .51 | 40,800 | .67 | 16,900 | .79 | 16,360 | 1.10 | 48,000 |
| | 40 | 5.00 | 1.25 | 72,600 | 1.25 | 32,900 | 1.70 | 32,300 | 2.30 | 87,000 |
| 3/4" brass tube | 10 | 3.05 | .81 | 29,600 | 1.23 | 13,700 | 1.7 | 13,320 | 1.37 | 35,500 |
| | 15 | 6.2 | 1.55 | 48,600 | 2.00 | 24,000 | 2.6 | 23,900 | 2.55 | 58,800 |
| | 25 | 15.6 | 3.45 | 89,500 | 3.6 | 48,700 | 4.5 | 49,300 | 5.7 | 111,200 |
| | 40 | 37.0 | 7.40 | 158,000 | 6.1 | 92,700 | 7.7 | 98,500 | 11.9 | 199,500 |
| 1/2" schedule 40 | 10 | 5.3 | 1.2 | 31,600 | 1.6 | 14,960 | 2.2 | 14,800 | 2.1 | 37,900 |
| | 15 | 11.7 | 2.4 | 51,600 | 2.8 | 26,200 | 3.5 | 25,400 | 4.7 | 63,000 |
| | 25 | 32.5 | 5.9 | 96,400 | 5.9 | 42,900 | 6.9 | 54,800 | 13.0 | 119,000 |
| | 40 | 80.0 | 15.5 | 171,000 | 11.8 | 101,100 | 16.2 | 109,600 | 34.0 | 214,000 |
| 3/8" schedule 80 | 5 | 5.7 | 1.2 | 25,600 | 1.6 | 13,300 | 2.3 | 13,300 | 2.4 | 31,900 |
| | 10 | 21.5 | 3.4 | 59,400 | 4.2 | 34,600 | 5.5 | 36,200 | 8.4 | 75,800 |
| | 20 | 80.0 | 13.0 | 139,000 | 11.6 | 89,100 | 14.1 | 99,000 | 36.0 | 179,000 |
| | 30 | 175.0 | 33.5 | 239,000 | 23.5 | 159,000 | 25.0 | 176,000 | 95.0 | 298,000 |

| Pipe size | Pressure drop of water with additament, p.s.i.—Continued | | | | | | | | | |
|---|---|---|---|---|---|---|---|---|---|---|
| | Sodium polystyrene sulfonate ($V_b$=1,250)—Continued | | | | Sulfonated polyvinyl toluene ($V_s$=41,000 cps.) | | | | | |
| | 10#/1,000 gal. | | 20#/1,000 gal. | | 2#/1,000 gal. | | 10#/1,000 gal. | | 20#/1,000 gal. | |
| | $\Delta P$, p.s.i. | Ré | $\Delta P$, p.s.i. | Ré | $\Delta P$, p.s.i. | Ré | $\Delta P$, p.s.i. | Ré | $\Delta P$, p.s.i. | Ré |
| 1" schedule 40 | .25 | 3,610 | | | .28 | 15,500 | .21 | 5,050 | .26 | 2,940 |
| | .37 | 6,630 | .61 | 3,620 | .53 | 25,500 | .36 | 8,550 | .41 | 5,130 |
| | .70 | 14,000 | .99 | 7,900 | 1.20 | 47,600 | .73 | 16,420 | .80 | 10,060 |
| | 1.40 | 28,500 | 1.80 | 16,600 | 2.55 | 84,500 | 1.50 | 30,150 | 1.53 | 18,820 |
| 3/4" brass tube | 1.14 | 11,700 | 1.54 | 6,860 | 1.74 | 34,800 | 1.28 | 12,300 | 2.0 | 7,700 |
| | 1.97 | 21,300 | 2.50 | 12,900 | 3.10 | 57,300 | 2.29 | 20,900 | 3.0 | 13,300 |
| | 4.1 | 45,800 | 4.8 | 28,500 | 7.0 | 106,200 | 4.78 | 40,300 | 5.3 | 26,100 |
| | 8.2 | 92,000 | 8.8 | 59,600 | 15.3 | 190,000 | 9.5 | 74,000 | 9.3 | 49,100 |
| 1/2" schedule 40 | 1.5 | 12,950 | 1.9 | 7,720 | 2.6 | 37,400 | 1.6 | 13,450 | 1.9 | 8,480 |
| | 2.6 | 23,900 | 3.1 | 14,600 | 5.5 | 61,400 | 2.9 | 22,700 | 3.2 | 14,600 |
| | 6.0 | 50,900 | 6.8 | 32,300 | 15.5 | 104,200 | 7.0 | 43,800 | 6.7 | 28,900 |
| | 13.5 | 102,500 | 15.0 | 67,500 | 41.0 | 206,000 | 16.2 | 80,600 | 13.5 | 54,100 |
| 3/8" schedule 80 | 1.3 | 12,100 | 1.9 | 7,400 | 2.8 | 30,700 | 1.6 | 11,420 | 1.7 | 7,360 |
| | 4.0 | 34,000 | 4.9 | 21,800 | 8.4 | 71,600 | 4.2 | 27,950 | 4.5 | 18,450 |
| | 12.5 | 94,900 | 13.2 | 64,200 | 34.0 | 167,000 | 14.6 | 68,500 | 13.3 | 46,600 |
| | 27.0 | 173,000 | 26.0 | 120,800 | 84.0 | 277,000 | 36.0 | 115,400 | 26.0 | 79,800 |

What is claimed is:

1. In a process wherein an aqueous mixture is moved in turbulent flow, under substantially steady state conditions at a modified Reynolds number in a range of $3 \times 10^3$ to $1 \times 10^7$ the improvement of reducing the friction loss due to the flow, which comprises intermixing with the aqueous mixture from 0.005 to 1 weight percent of a linear, high molecular weight, water-soluble polymer sulfonate which is an addition polymer of a monoalkenyl-aromatic sulfonate having the formula

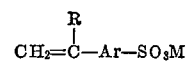

wherein Ar is a divalent aromatic radical selected from the group consisting of hydrocarbon radicals and nuclear chlorinated hydrocarbon radicals having its valence bonds on nuclear carbon atoms, R is a member of the group consisting of hydrogen and methyl, and M is a cation, said polymer sulfonate in its neutral sodium salt form at 0.5 percent by weight concentration in pure water having a Brookfield viscosity, $V_b$, of at least 200 centipoises at 25° C.

2. A process according to claim 1 wherein the polymer sulfonate is sodium polystyrene sulfonate.

3. A process according to claim 1 wherein the polymer sulfonate is sulfonated polyvinyl toluene.

4. A process for reducing the friction loss in flow of an aqueous mixture in turbulent flow, under substantially steady state condition at a modified Reynolds number of $3 \times 10^3$ to $1 \times 10^7$ which comprises adding to the aqueous mixture from .005 to 1 weight percent of a linear, high molecular weight, water-soluble polymer sulfonate which is an addition polymer of a monoalkenylaromatic sulfonate having the formula

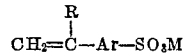

wherein Ar is a divalent aromatic radical selected from the group consisting of hydrocarbon radicals and nuclear chlorinated hydrocarbon radicals having its valence bond on nuclear carbon atoms, R is a member of the group consisting of hydrogen and methyl, and M is a cation, said polymer sulfonate in its neutral sodium salt form at 0.5 percent by weight concentration in pure water having a Brookfield viscosity, $V_b$, of at least 200 centipoises at 25° C. and pumping the fluid through a duct at a modified Reynolds number in the range of $3 \times 10^3$ to $1 \times 10^7$.

5. A process according to claim 4 wherein the fluid is pumped through the conduit at a modified Reynolds number in the range of $1 \times 10^4$ to $1 \times 10^5$.

6. A process according to claim 5 wherein the polymer has a viscosity in the range of from 1300 to 4000 centipoises at 25° C. and is added in an amount of from 0.025 to .25 weight percent.

7. A process according to claim 6 wherein the polymer sulfonate is sodium polystyrene sulfonate.

8. A process according to claim 6 wherein the polymer sulfonate is sulfonated polyvinyl toluene.

References Cited in the file of this patent

UNITED STATES PATENTS

| | | |
|---|---|---|
| 2,132,873 | Milhorn | Oct. 11, 1938 |
| 2,492,173 | Mysels | Dec. 27, 1949 |
| 2,706,534 | Hunter | Apr. 19, 1955 |